(12) United States Patent
Desy et al.

(10) Patent No.: US 6,971,843 B2
(45) Date of Patent: Dec. 6, 2005

(54) HYDRAULIC TURBINE DRAFT TUBE WITH ENHANCED DISSOLVED OXYGEN

(75) Inventors: Normand Desy, Laval (CA); Roger Grenier, St-Eustache (CA)

(73) Assignee: General Electric Canada Inc., Mississauga (CA)

(*) Notice: Subject to any disclaimer, the term of this patent is extended or adjusted under 35 U.S.C. 154(b) by 240 days.

(21) Appl. No.: 10/602,601

(22) Filed: Jun. 25, 2003

(65) Prior Publication Data
US 2004/0265117 A1 Dec. 30, 2004

(51) Int. Cl.$^7$ ............................................. F01D 25/30
(52) U.S. Cl. .................... 415/116; 60/696; 261/37; 261/91; 261/93; 261/DIG. 75
(58) Field of Search ................ 415/115–116, 110–112, 415/170.1, 173.6, 173.1, 173.3, 173.5, 174.2, 415/174.5, 168.2–168.4; 60/686, 689, 696; 261/37, 91, 93, DIG. 75

(56) References Cited

U.S. PATENT DOCUMENTS

| | | | |
|---|---|---|---|
| 2,300,748 A | * | 11/1942 | Rheingans ................... 60/689 |
| 3,185,440 A | * | 5/1965 | Hullmann et al. .......... 415/116 |
| 3,724,966 A | | 4/1973 | Sproule |
| 4,142,825 A | | 3/1979 | Koeller |
| 4,142,826 A | | 3/1979 | Koeller |
| 4,146,351 A | | 3/1979 | Koeller |
| 4,780,051 A | | 10/1988 | Fisher, Jr. |
| 5,823,740 A | | 10/1998 | Cybularz et al. |
| 5,879,130 A | | 3/1999 | Beyer et al. |
| 5,896,657 A | | 4/1999 | Beyer et al. |
| 5,924,842 A | | 7/1999 | Beyer et al. |
| 5,924,844 A | | 7/1999 | Cybularz et al. |
| 5,941,682 A | | 8/1999 | Cybularz et al. |
| 6,095,749 A | | 8/2000 | Beyer et al. |
| 6,155,783 A | | 12/2000 | Beyer |
| 6,247,893 B1 | | 6/2001 | Beyer et al. |
| 6,454,533 B2 | | 9/2002 | Beyer |

FOREIGN PATENT DOCUMENTS

| | | |
|---|---|---|
| FR | 2809139 | 11/2001 |
| SU | 1263902 A | * 10/1986 |

* cited by examiner

Primary Examiner—Christopher Verdier

(57) ABSTRACT

A hydraulic turbine has a gas distribution manifold mounted to an inside wall of a draft tube downstream from a turbine runner. The gas distribution manifold extends at least substantially around the first inside wall of the draft tube. The gas distribution manifold has a plurality of gas outlet ports for discharging oxygen into the water as the oxygen containing gas passes there around. An oxygen containing gas supply extends along a person access passageway and through the wall of the draft tube into the gas distribution manifold adjacent a man hole door.

22 Claims, 3 Drawing Sheets

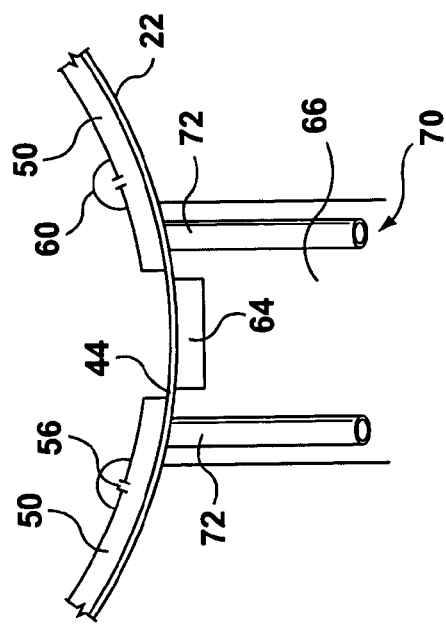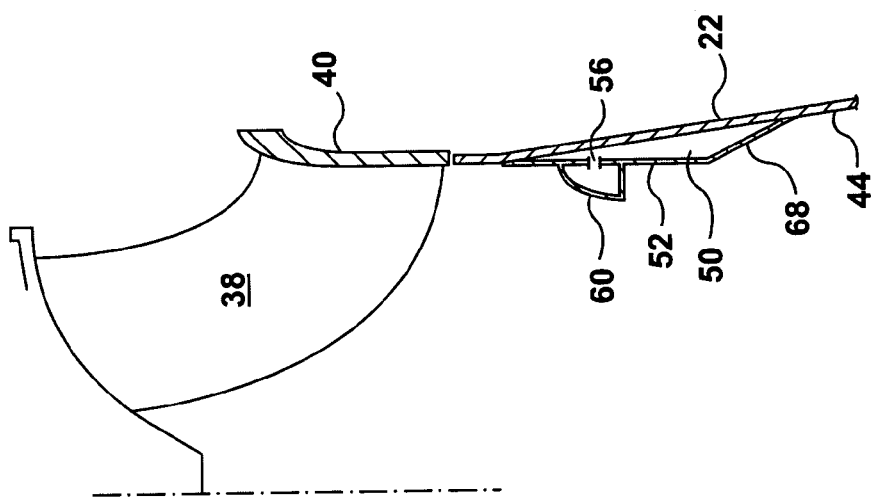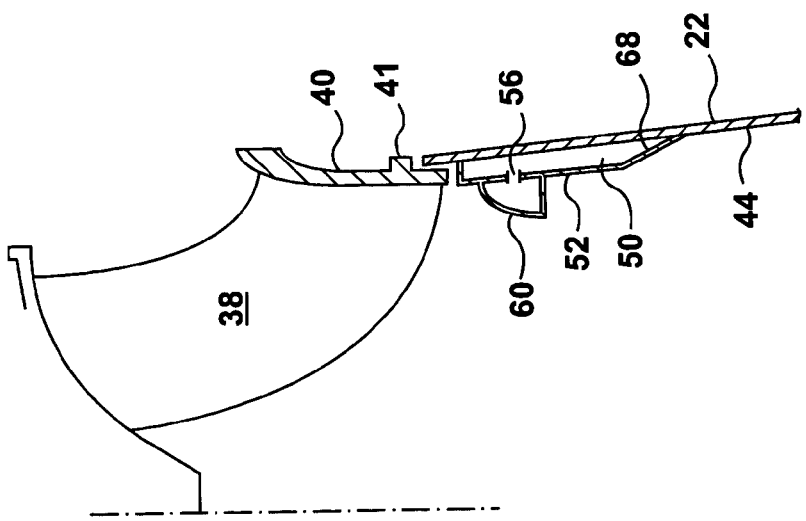

HYDRAULIC TURBINE DRAFT TUBE WITH ENHANCED DISSOLVED OXYGEN

FIELD OF THE INVENTION

The present invention relates to a hydraulic turbine and, in particular, to a draft tube for a turbine adapted to increase the dissolved oxygen content of water discharged from the turbine.

BACKGROUND OF THE INVENTION

The oxygen levels of water discharged from hydraulic turbines used in hydroelectric installations have been known to provide an environmental problem due to the discharged water having relatively low levels of dissolved oxygen. The problem is more predominant in the summer months. During the summer months, thermal stratification of water in an upstream water reservoir creates warmer water near the surface having relatively high dissolved oxygen and a colder water near the bottom of the reservoir having relatively lower dissolved oxygen. Because the water utilized by the turbines is usually taken from the bottom of the reservoir, this water presents a potentially environmental hazard when discharged downstream by the turbines.

In the building of new hydroelectric installations and the refurbishing of existing hydroelectric installations, there is an opportunity to improve the level of dissolved oxygen in the water by introducing oxygen to the water as it passes through the turbine. It is known to admit air through one or more runner blades in the turbine as disclosed in U.S. Pat. No. 5,879,130 issued Mar. 9, 1999; U.S. Pat. No. 5,896,657 issued Apr. 27, 1999; U.S. Pat. No. 5,924,842 issued Jul. 20, 1999; U.S. Pat. No. 6,155,783 issued Dec. 5, 2000; U.S. Pat. No. 6,247,893 issued Jun. 19, 2001, and U.S. Pat. No. 6,454,533 issued Sep. 24, 2002. However, each of these turbines requires introducing air through at least one of the moveable turbine runner blades. This requires complex blade manufacture and the introduction of air through a moving part.

It is also known from U.S. Pat. No. 4,142,825 issued Mar. 6, 1979; U.S. Pat. No. 4,142,826 issued Mar. 6, 1979 and U.S. Pat. No. 4,146,351 issued Mar. 27, 1979, to admit air through the foundation of the draft tube. The purpose of this air admission however, is to quiet pressure pulsations and cavitation problems caused by high or part load rope vortices within the draft tube. A finite number of shroud covered air outlets extend through the draft tube to provide the air admission. These patents, however are not concerned with an even distribution of oxygen gas into the draft tube to increase dissolved oxygen in the water passing through the turbine. Further, because the draft tube is usually embedded in a concrete foundation, providing multiple air supply lines in embedded concrete is cumbersome and is not well suited for use in an existing turbine to be refurbished.

It is also known from U.S. Pat. No. 5,941,682 issued Aug. 24, 1999 to enhance oxygen content in water passed through a turbine by having a gas chamber substantially surrounding an upper peripheral portion of the draft tube and by having a continuous gas discharge slot that extends about an entire circumference of the water passage. Gas is discharged from the slot under pressure into the water passage so that the level of dissolved oxygen in the water discharged from the turbine is increased. To utilise this arrangement in existing turbine installations, however, involves costly removal of an upper portion of the draft tube along with a 360° surrounding portion of the concrete from the foundation. Further, the patent recites the gas plenum chamber contains gas at a higher pressure than the local water pressure adjacent the slot whereby the chamber remains substantially free of water and gas is discharged from the slot into the water passageway.

Accordingly, there is a need for a relatively less labour intensive and less complex draft tube construction that permits for the introduction of oxygen into the water passing through the turbine.

SUMMARY OF THE INVENTION

The present invention relates to a hydraulic turbine adapted to introduce oxygen into the water flowing through the water passageway of the turbine. This is accomplished by a gas distribution manifold mounted to the inside wall of the draft tube where the gas distribution manifold has a plurality of gas outlet ports spaced around the gas distribution manifold. An oxygen containing gas supply passes through the draft tube wall to supply an oxygen containing gas for distribution by the gas distribution manifold there around and out through the gas outlet ports into the water passage.

The present invention has the advantage that the gas distribution manifold may be readily mounted to the inside of the draft tube without requiring any alteration in the concrete foundation supporting the draft tube. Further, the gas distribution manifold, from a labour installation perspective, is relatively easy to install and requires minimal changes to the draft tube wall for supplying oxygen containing gas to the gas distribution manifold. Further, the gas distribution manifold circulates or distributes the oxygen containing gas about the manifold and out the outlet ports to increase the dissolved oxygen in the water being discharged from the water passageway. Also an oxygen containing gas supply passes through the inner wall of the draft tube at one or more chosen locations without requiring multiple gas supply pipes passing through multiple locations spaced around the draft tube wall. This simplifies or eliminates reconstruction of the concrete foundation about the draft tube during refurberation of a turbine installation to accommodate gas supply lines.

In a typical hydraulic turbine installation, the concrete foundation is typically provided with a person access passageway that leads to the draft tube wall and a man hole door cover across an opening in the draft tube wall that permits access to a person into the draft tube to effect any inspection or repair without having to remove the turbine runner. It is envisaged within the preferred aspect of the present invention that the oxygen containing supply extends through the person access passageway and through the inside wall of the draft tube adjacent the man hole door and into the gas distribution manifold. This provides the advantage that the concrete foundation of the turbine installation does not have to be altered for the insertion of an oxygen containing gas supply. Further, the oxygen containing gas supply passes through the access passageway and is readily available for inspection. It should be understood that in such instances, the gas distribution manifold does not necessarily extend completely around the inside wall of the draft tube and may stop at a portion of the draft tube inner wall adjacent the man hole door.

In one aspect of the present invention, the gas distribution manifold is provided with gas outlet ports passing through a shroud covering each of the gas outlet ports and providing an interior arrangement responsive to the flow of water along the water passageway. It should be understood that these shrouds may extend further into the water passageway than the inside wall of the gas distribution manifold. The use of the shrouds creates a negative pressure adjacent the gas outlet ports which draws gas through the gas outlet ports from the gas distribution manifold. The number and shape of shrouds may vary to maximize their effect on drawing gas from the manifold into the draft tube. Alternatively, one continuous shroud may be attached to the manifold and extend around, or substantially around, the inside of the draft tube wall.

In an alternative aspect of the present invention, the gas distribution manifold may include a downstream inclined wall angled and extending from the inside wall of the gas distribution manifold to the inside wall of the draft tube. A plurality of gas outlet ports are located in the downstream inclined wall and as a result provide a venturi arrangement responsive to the flow of water along the water passageway, over the inside wall of the gas distribution manifold and the inside wall of the draft tube.

The outlet ports of the gas distribution manifold may vary in size, number and position around the gas distribution manifold so as to control the amount of oxygen containing gas introduced into the water. It should be understood that the introduction of oxygen containing gas to the gas distribution manifold at one or more locations may result in a more concentrated introduction of the oxygen containing gas at that location. Accordingly, the size, number and positioning around the gas distribution manifold of the outlet ports may be varied in order to control the amount of oxygen containing gas introduced into the water so as to provide for a more even distribution of the oxygen containing gas into the water passageway. It is envisaged for example that the outlet ports adjacent the oxygen containing gas supply line may be of different number and/or size than the outlet ports displaced around the gas distribution manifold and located further away from the oxygen containing gas supply line. It is also contemplated that the gas distribution manifold may be provided with baffles for regulating or directing the flow of oxygen containing gas thereabout and out of the outlet ports.

The oxygen containing gas may be ambient air or alternatively the gas may be pressurised.

In accordance with an aspect of the present invention, there is provided a hydraulic turbine adapted to introduce oxygen into water flowing through a water passageway of the turbine. The turbine comprises a rotatably mounted runner and a draft tube extending downstream of the runner. The draft tube has a first inside wall. The turbine comprises a gas distribution manifold mounted to, and extending at least substantially around, the first inside wall of the draft tube. The gas distribution manifold has a plurality of gas outlet ports distributed around the gas distribution manifold. The turbine comprises an oxygen containing gas supply passing through the first inside wall of the draft tube and being connected to the gas distribution manifold for supplying an oxygen containing gas to the gas distribution manifold whereby the oxygen containing gas flows around the gas distribution manifold within the draft tube and is discharged from the plurality of gas outlet ports of the gas distribution manifold into the water passageway was to increase dissolved oxygen in the water discharged from the water passageway.

BRIEF DESCRIPTION OF THE DRAWINGS

For a better understanding of the nature and objects of the present invention reference may be had to the accompanying diagrammatic drawings in which:

FIGS. 2A and 2B are partial sectional views showing a turbine runner and the location of the gas distribution manifold;

FIG. 3 is a bottom view of the draft tube and distribution manifold of FIG. 1 taken along the line 3—3 shown in FIG. 1;

DESCRIPTION OF THE PREFERRED EMBODIMENTS

The present invention relates to a hydraulic turbine and, in particular, to a draft tube of a turbine adapted to increase the dissolved oxygen content of water discharged from the turbine.

Figure 1:
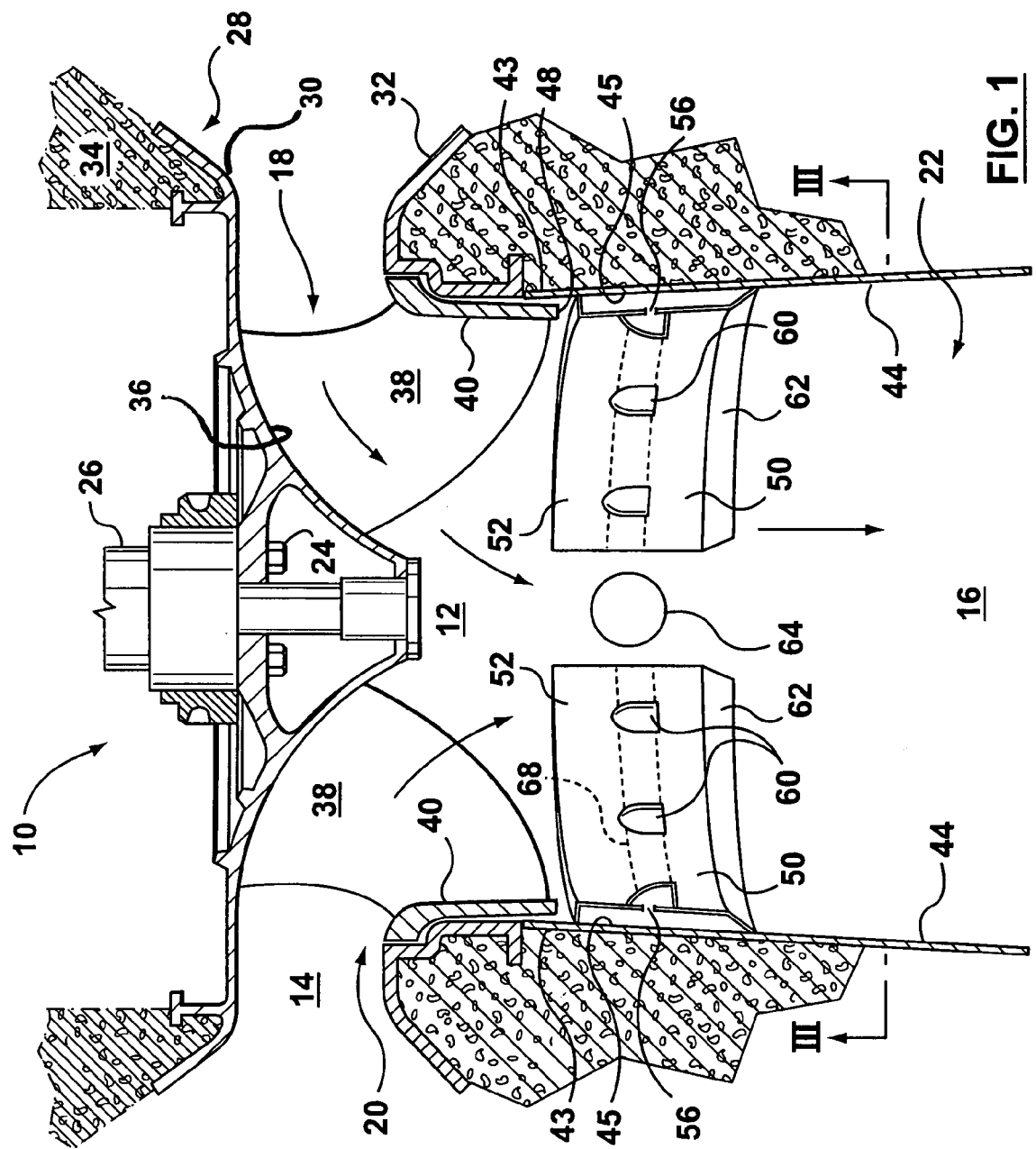
FIG. 1 is an elevational view, partially in cross-section, of a Francis turbine showing a gas distribution manifold mounted to the draft tube inside wall.

Referring to FIGS. 1 to 3, a portion of one embodiment of a turbine installation 10 is illustrated for use in the generation of hydroelectricity. The installation 10 has a water passageway 12. Water flows from an inlet 14 of passageway 12 to an outlet 16 located at a lower elevation. The water passageway 12 passes through a Francis turbine 18 having a runner 20 and a draft tube 22. The runner 20 is secured by bolts 24 to a shaft 26 transmitting energy to a generator (not shown). The turbine 18 is mounted in a stationary casing 28 having a head cover 30 and a bottom discharge ring 32. The head cover 30, discharge ring 32 and draft tube 22 are embedded in concrete foundation 34.

Runner 20 is rotatably mounted in casing 28 and has a crown 36 and a plurality of circumferentially spaced runner blades 38 extending therefrom to an enclosing band 40.

It should be understood that installation 10 includes other components such as, for example, stay vanes and wicket gates which are not shown.

The enclosing band 40 has a first diameter. The draft tube 22 has a first inside wall 44 that has a second diameter. The second diameter is measured adjacent the band 40 and is shown to be greater than the first diameter of the band 40 in FIGS. 1 and 2A. The first inside wall 44 of the draft tube 22 is recessed outwardly as shown by a step 48 from the band 40. The draft tube 22 is also shown to diverge outwardly as the draft tube 22 extends in the downstream direction. In FIG. 2B, the first inside wall 44 of the draft tube 22 is substantially a continuum surface from band 40 in the water passageway 22.

A gas distribution manifold 50 is mounted to and extends at least substantially around a portion 45 of the first inside wall 44 of the draft tube 22. The manifold 50 is mounted to inside wall 44 by welding of the manifold to the wall 44 whereby inside wall portion 45 forms or defines one of the closing walls of the manifold 50. The gas distribution manifold 50 has a second inside wall 52. This second inside wall 52 of the manifold 50 provides a continuum in the water passageway 12 from the enclosing band 40 of the turbine runner 20. This continuum in the water flow passageway 12 does not introduce any encumbrances that significantly affect or alter the water flow through the turbine runner 20 and the draft tube 22.

As shown in FIG. 2A, the band 40 has an outturned lip 41 that overlies upper portion 43 of first inside wall 44 of draft tube 22 to allow for the runner to be temporarily supported on the top of the draft tube during installation phase.

In FIGS. 1 to 3, the gas distribution manifold 50 is shown to comprise outlet ports 56. The outlet ports 56 are spaced about the circumference of the gas distribution manifold 50 and each have a shroud covering 60. Shroud coverings 60 extend slightly into the water passageway 12. The shroud coverings 60 cover the outlet ports 56 and provide a venturi arrangement responsive to the flow of water along the water passageway 12. This induces gas to flow out from the outlet ports 56.

A man hole door 64 is located in the first inside wall 44 of the draft tube 22. The man hole door 64 provides access into the interior of the draft tube 22 without having to remove the turbine runner 20. The man hole door 64 is located at the end of a person access passageway 66 formed in the concrete foundation 34. The man hole door 64 is positioned in such a manner that the gas distribution manifold 50 does not extend completely around the inside wall portion 45 of the draft tube 22. Further, the gas distribution manifold 50 may be provided with baffles 68 which are shown in dotted lines in FIG. 1. The purpose of the baffles 68 is to regulate the flow of gas within the gas distribution manifold 50. The manifold 50 in this preferred aspect comprises three walls and is shown welded to the draft tube 22 with wall portion 44 closing the manifold 50 to define an enclosed gas passageway. Alternatively, the gas distribution manifold 50 could have an enclosed chamber in cross-section that is mounted to inside wall 44 of draft tube 22.

The installation 10 further includes an oxygen containing gas supply 70 (see FIG. 3) in the form of two pipes 72 that pass along the person access passageway 66, through the first inside wall 44 of the draft tube 22 and into the gas distribution manifold 50. In the embodiment shown there are two gas supply entrances to the manifold 50. It should be understood that more than two pipes 72 or only one pipe 72 may be utilized. The oxygen containing gas supply 70 provides oxygen in the gas either in the form of ambient air under no pressure, a pressurized gas, or a pressurized ambient air. The gas flows either under pressure or due to the venturi effect along the pipes 72, into the gas distribution manifold 50 and out the plurality of outlet ports 56 into the water passing through the passageway 12 in the draft tube 22. This introduction of the oxygen containing gas into the water passageway 12 of the turbine 18 increases the dissolved oxygen in the water discharged from the water passageway 12.

Figure 4:
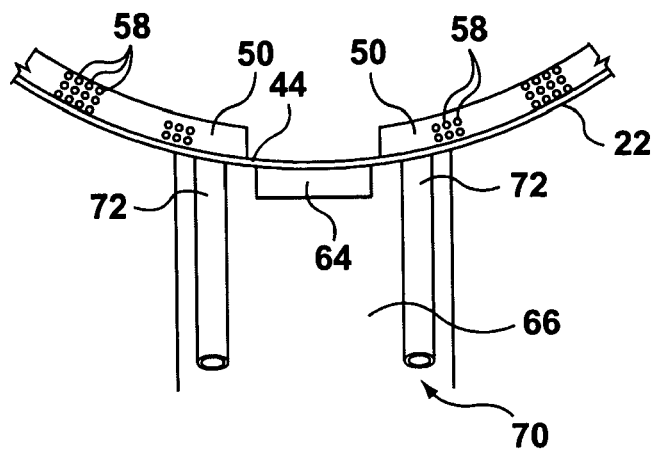
FIG. 4 is a view similar to FIG. 3 except that different gas outlet ports are illustrated for the gas distribution manifold.

Referring to FIG. 4, outlet ports 58 are shown located in a downstream positioned inclined wall 62. In this embodiment the outlet ports 58 replace outlet ports 56. The Inclined wall 62 is angled from the second inside wall 52 to the first inside wall 44 of the draft tube 22. This inclination provides a venturi arrangement for the outlet ports 58 that is responsive to the flow of water or water along the water passageway over the first and second inside walls 44 and 52, respectively.

The outlet ports 56 or 58 may be uniformly spaced around the manifold 50 or, alternatively, may increase in number of outlet ports grouped together in groups spaced evenly about the inclined wall 62. Hence, the size and grouping of the outlet ports 56 and 58 may be chosen to control the oxygen introduction into the water passageway 22.

Figure 5:
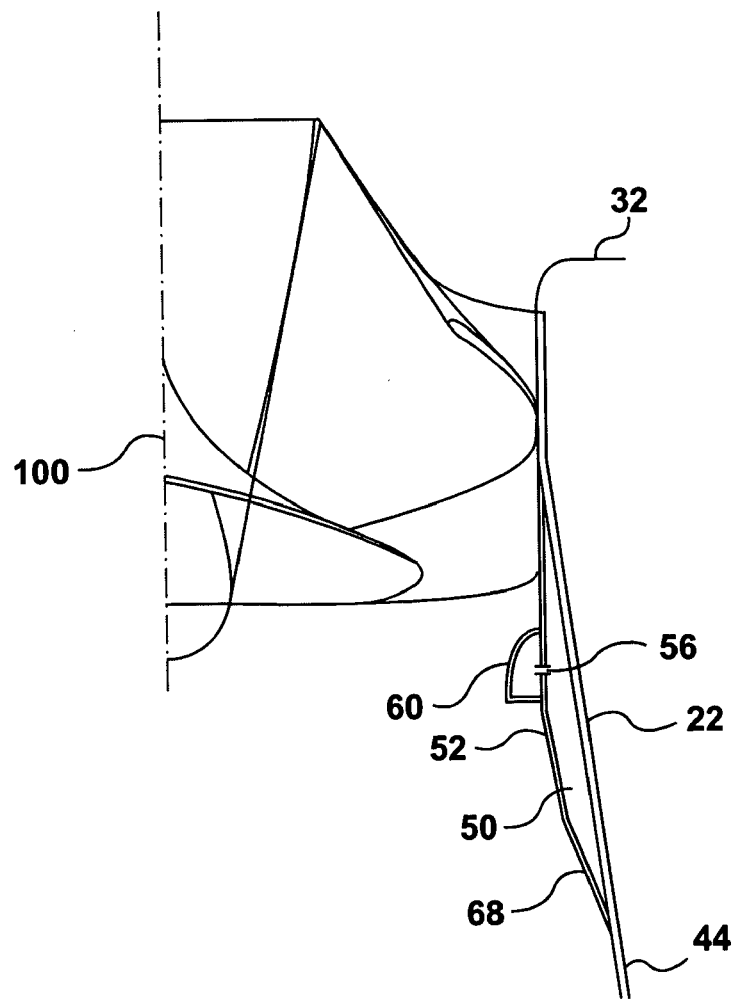
FIG. 5 is a view similar to FIGS. 2A and 2B illustrating the invention in use with a fish friendly turbine runner.

Referring to FIG. 5, there is shown a turbine installation 10 having a fish friendly turbine 100. As shown, the gas distribution manifold 50 is mounted to the inside wall 44 of draft tube 22 in the same manner as that shown and described for FIGS. 1 to 3.

It should be understood that the shape of the manifold 50 may be different than that shown in the illustrated embodiments. It is within the scope of the present invention to alter the shape of the manifold 50 so long as the manifold remains mounted to the inside wall of the draft tube 22.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A hydraulic turbine adapted to introduce oxygen into water flowing through a water passageway of the turbine, the turbine comprising:
   a rotatably mounted runner;
   a draft tube extending downstream of the runner, the draft tube having a first inside wall;
   a gas distribution manifold mounted to, and extending at least substantially around, the first inside wall of the draft tube, and the gas distribution manifold having a plurality of gas outlet ports distributed around the gas distribution manifold; and,
   an oxygen containing gas supply passing through the first inside wall of the draft tube and being connected to the gas distribution manifold for supplying an oxygen containing gas to the gas distribution manifold whereby the oxygen containing gas flows around the gas distribution manifold within the draft tube and is discharged from the plurality of gas outlet ports of the gas distribution manifold into the water passageway to increase dissolved oxygen in the water discharged from the water passageway.

2. The hydraulic turbine of claim 1 wherein the oxygen containing gas is ambient air.

3. The hydraulic turbine of claim 2 wherein the ambient air is pressurized.

4. The hydraulic turbine of claim 1 wherein the oxygen containing gas is supplied under pressure.

5. The hydraulic turbine of claim 1 wherein each of the gas outlet ports has a shroud covering providing a venturi arrangement responsive to flow of water along the water passageway.

6. The hydraulic turbine of claim 1 wherein the gas distribution manifold comprises a second inside wall spaced from the first inside wall of the draft tube and a downstream inclined wall angled and extending from the second inside wall to the first inside wall of the draft tube, and wherein the plurality of gas outlet ports are located in the downstream inclined wall providing a venturi arrangement responsive to flow of water along the water passageway over the first and second inside walls.

7. The hydraulic turbine of claim 1 wherein the gas distribution manifold includes baffles for controlling the volume of oxygen containing gas into the water passageway around the gas distribution manifold.

8. The hydraulic turbine of claim 1 positioned in a concrete foundation and wherein the draft tube further includes a man hole door permitting access through the first inside wall into the draft tube, a person access passageway leading to the man hole door located in the concrete foundation and the oxygen containing gas supply extending through the person access passageway and through the first inside wall of the draft tube adjacent the man hole door and into the gas distribution manifold.

9. The hydraulic turbine of claim 8 wherein the gas distribution manifold extends around the first inside wall of the draft tube except for a portion of the first inside wall where the man hole door is positioned.

10. The hydraulic turbine of claim 1 wherein a wall portion of the first inner wall of the draft tube forms part of the gas distribution manifold.

11. The hydraulic turbine of claim 6 wherein a wall portion of the first inner wall of the draft tube forms part of the gas distribution manifold.

12. A turbine installation configured to introduce oxygen into water passing through a water passageway of a turbine, the installation comprising:
a stationary casing for containing the turbine and defining the water passageway, the casing extending from an upstream inlet to a downstream outlet and including a head cover and a discharge ring;
a runner rotatably disposed in the casing so that water flowing therethrough impinges on the runner;
a draft tube extending downstream of the runner, the draft tube having a first inside wall diverging outwardly in the downstream direction of water passing through the draft tube;
a gas distribution manifold mounted to, and extending at least substantially around, a wall portion of the first inside wall of the draft tube, the gas distribution manifold having a plurality of gas outlet ports spaced around the gas distribution manifold; and,
an oxygen containing gas supply passing through the first inside wall of the draft tube and being connected to the gas distribution manifold for supplying an oxygen containing gas whereby the oxygen containing gas flow around the gas distribution manifold and is discharged from the plurality of gas outlet ports into the water passageway to increase dissolved oxygen in the water discharged from the water passageway.

13. The turbine installation of claim 12 wherein the oxygen containing gas is ambient air.

14. The turbine installation of claim 13 wherein the ambient air is pressurized.

15. The turbine installation of claim 12 wherein the oxygen containing gas is supplied under pressure.

16. The turbine installation of claim 12 wherein each of the gas outlet ports has a shroud covering for providing a venturi arrangement responsive to flow of water along the water passageway.

17. The turbine installation of claim 12 wherein the gas distribution manifold comprises a second inside wall spaced from the first inside wall of the draft tube and a downstream inclined wall angled and extending from the second inside wall to the first inside wall of the draft tube, and wherein the plurality of gas outlet ports are located in the downstream inclined wall providing a venturi arrangement responsive to flow of water along the water passageway over the first and second inside walls.

18. The turbine installation of claim 12 wherein the gas distribution manifold includes baffles for controlling the volume of oxygen containing gas into the water passageway around the gas distribution manifold.

19. The turbine of claim 12 positioned in a concrete foundation and wherein the draft tube further includes a man hole door permitting access through the first inside wall into the draft tube, a person access passageway leading to the man hole door located in the concrete foundation and the oxygen containing gas supply extending through the person access passageway and through the first inside wall of the draft tube adjacent the man hole door and into the gas distribution manifold.

20. The turbine installation of claim 19 wherein the gas distribution manifold extends around the first inside wall of the draft tube except for a portion of the first inside wall where the man hole door is positioned.

21. The turbine installation of claim 12 wherein the wall portion of the first inner wall of the draft tube forms part of the gas distribution manifold.

22. The turbine installation of claim 17 wherein the wall portion of the first inner wall of the draft tube forms a part of the gas distribution manifold.

* * * * *